Patented Apr. 26, 1938

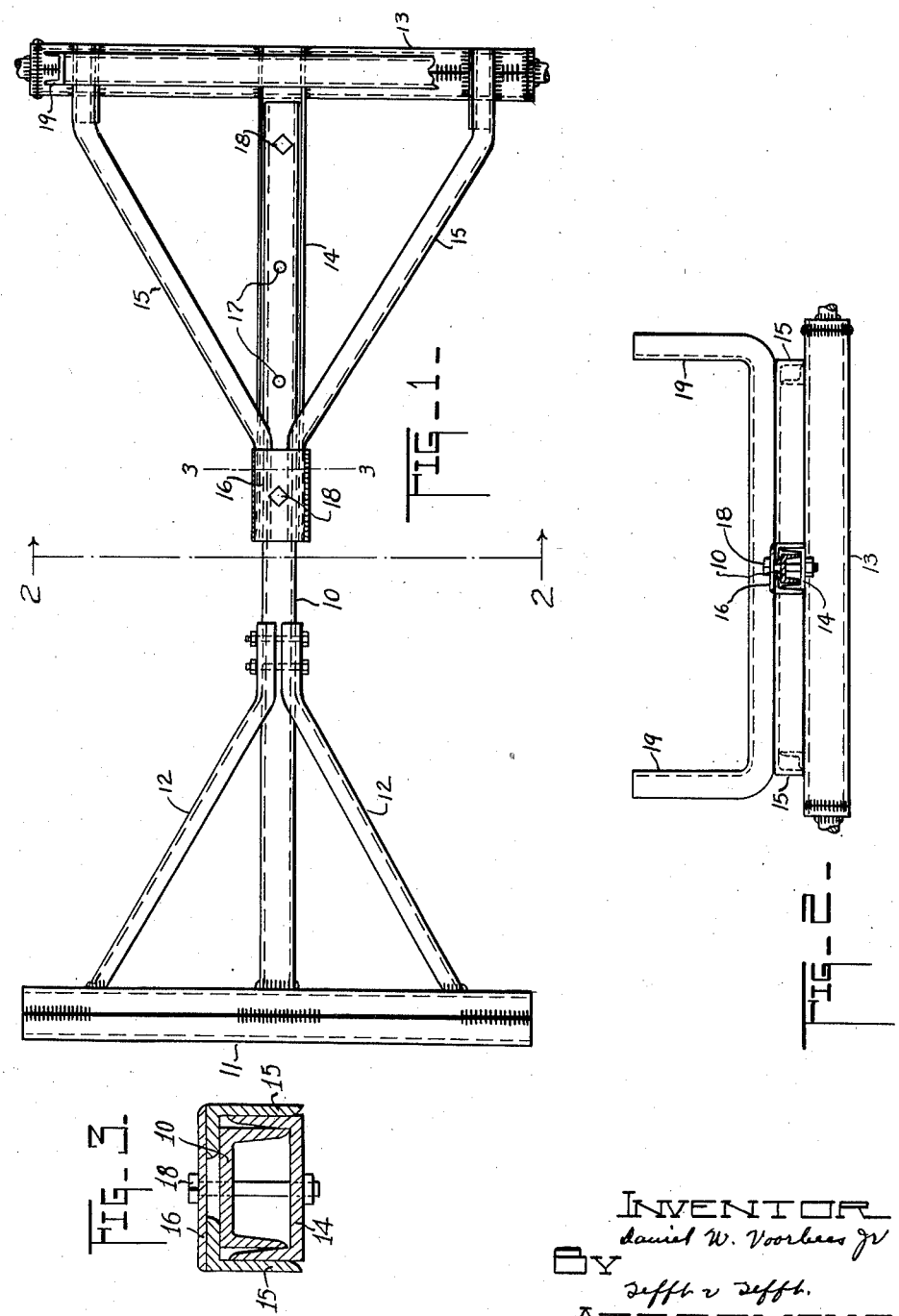

2,115,566

UNITED STATES PATENT OFFICE 2,115,566

WAGON RUNNING GEAR

Daniel W. Voorhees, Jr., Peru, Ill.

Application February 26, 1936, Serial No. 65,804

1 Claim. (Cl. 280—142)

This invention has reference to the art of making wagon running gear and has for its principal object to provide a novel arrangement and structure of reach and rear axle, which permits manufacture of a gear having the characteristics of strength, ruggedness and simplicity at reasonable cost.

The invention is clearly disclosed in the following specification and accompanying drawing, in which:

Fig. 1 is a plan view showing a gear embodying my invention, and Fig. 2 is a sectional elevational view taken on line 2—2 in Fig. 1. Figure 3 is an enlarged sectional view taken substantially along the line 3—3 of Figure 1.

My device comprises a structure including a reach 10 attached to a front axle member 11, and a rear axle structure as will be described.

The reach 10 is secured to the front axle in any secure manner, such as by welding, and the connection is reinforced by means of hounds 12 which are suitably attached to the axle and reach in the arrangement shown. The reach is preferably made from channel steel.

A rear axle member 13 carries a frame element 14 which is preferably made from channel steel and is attached to the axle by welding or other suitable means, and is reinforced by a pair of hounds 15 placed in the arrangement shown.

The member 14 extends a suitable distance from axle 13 and its free end is joined to the hounds, which latter are attached to the axle near the ends of the latter.

A plate 16 is disposed over the outer ends of hounds 15 and member 14 and is joined to them in such a manner as to form a unitary end structure, the parts being so arranged that an open space is provided through which the reach 10 is inserted and retained in slidable relation.

Reach 10 is provided with a series of holes 17, and plate 16 and member 14 have holes so placed as to register with those in the reach.

It will be apparent that the reach and front axle may be moved to various positions with respect to the rear axle structure whereupon pins or bolts 18 are inserted in the registered holes and the two structures are held in position to form a sturdy frame. By the means described the length of the frame is adjusted to meet the requirements of practical use.

Stake members 19 may be attached to the axles in any convenient manner, but the invention is complete without them.

In the illustrative arrangement shown in the drawing, particularly in Fig. 2, the reach 10 is disposed with its web side uppermost while member 14 is disposed with its web side down, with one leg or side of the hounds 15 overlying the upper edges of member 14. The other leg of the hounds is attached to the sides of member 14, and plate 16 is attached to the upper or horizontal side of the hounds.

With the above arrangement, the member 14 obviously forms a groove adapted to receive reach 10 in slidable arrangement, and the closed passage formed under plate 16 provides a means for holding the reach in proper position with respect to the rear axle assembly.

The foregoing has described my invention. Modification of structure is obviously possible without alteration of the principle disclosed. I do not wish to be limited in structure or function except within the scope of the appended claim.

What I claim is:

A running gear of the class described having in combination, a front axle and a rear axle, a downwardly facing channel shaped reach secured to the front axle and extending toward the rear axle, means for maintaining the front axle and reach in substantially fixed relation to one another, an upwardly facing channel member rigidly secured to the rear axle and projecting toward the front axle, said channel shaped reach being slidable within the channel of said channel member, angle shaped hounds connecting the rear axle and said channel member at their inner ends and overlapping the channel of the channel member, a reinforcing plate disposed over said ends of said angle hounds and secured thereto and extending across the channel of said channel member to provide a unitary box-like housing through which the reach may be slid, said plate, reach and channel member having registerable apertures, and a removable fastener passing through said registerable apertures in the plate, reach and channel members.

DANIEL W. VOORHEES, Jr.